(No Model.)  2 Sheets—Sheet 1.

S. MOORE & G. A. HADLEY.
TIME GLOBE.

No. 270,329.  Patented Jan. 9, 1883.

WITNESSES.
Wm. L. Cox.
H. J. Miller.

INVENTOR.
Samuel Moore
George A. Hadley
by Dodge, Miller & Co.
Atty's

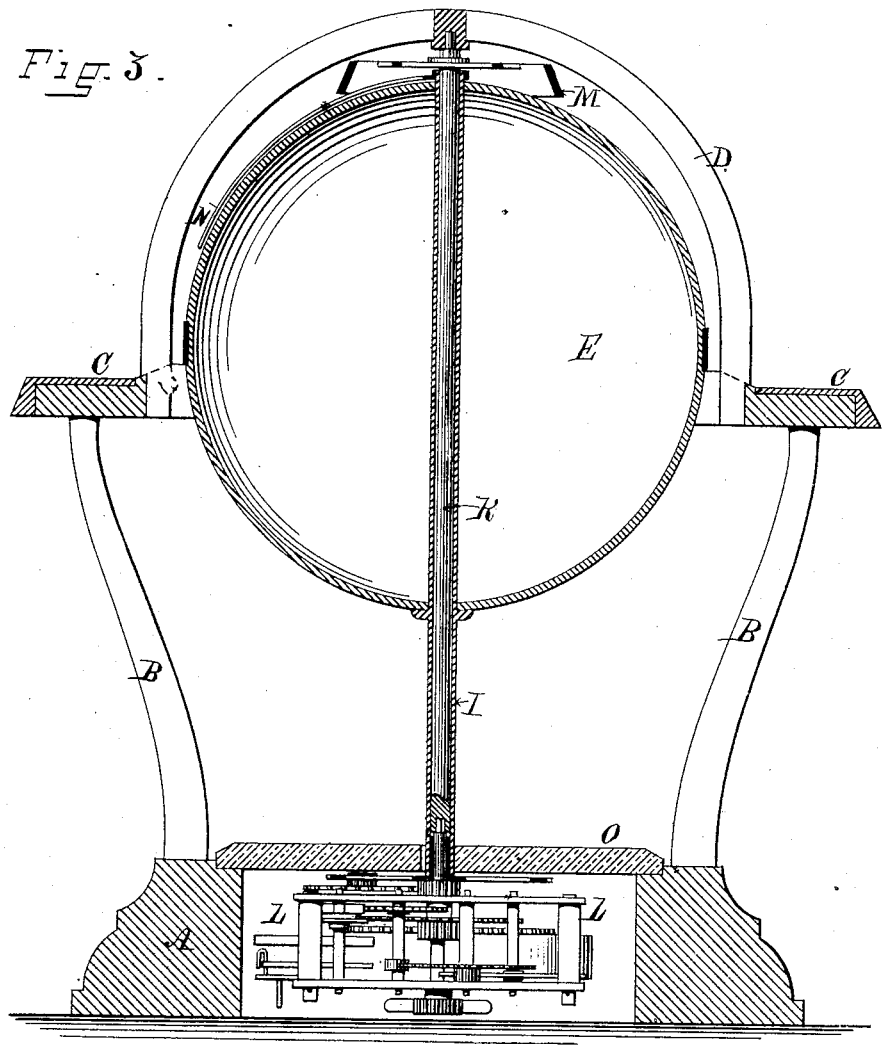

UNITED STATES PATENT OFFICE.

SAMUEL MOORE AND GEORGE A. HADLEY, OF PROVIDENCE, RHODE ISLAND.

TIME-GLOBE.

SPECIFICATION forming part of Letters Patent No. 270,329, dated January 9, 1883.

Application filed July 3, 1882. (No model.)

*To all whom it may concern:*

Be it known that we, SAMUEL MOORE and GEORGE A. HADLEY, both of the city and county of Providence, and State of Rhode Island, have invented a new and useful Improvement in Clocks; and we hereby declare that the following is a full, clear, and exact description of the same, reference being had to the accompanying drawings, forming part of this specification.

This invention has reference to improvements in clocks, in which a spherical representation of the earth is made to turn by clockwork and indicate the time at different parts of the earth.

The invention consists in the peculiar construction of the clock, and in the various devices by which the time of day or night at the different parts of the earth can be ascertained, as will be more fully set forth hereinafter.

Figure 1:
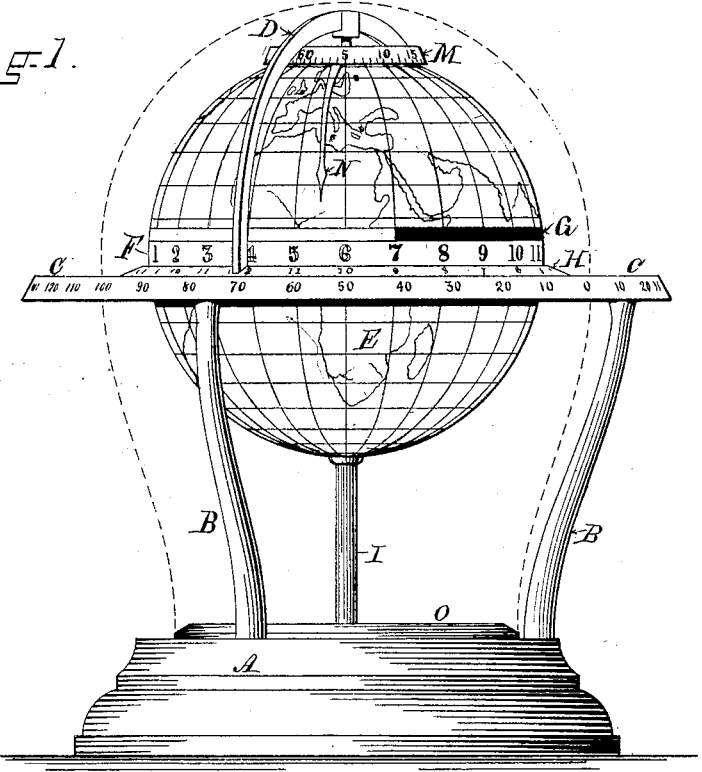
Figure 2:
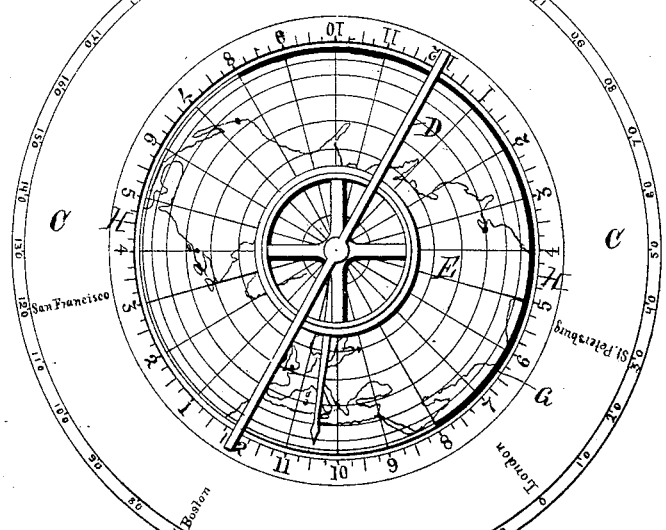

Figure 1 is a view of our improved geographical clock. Fig. 2 is a top view of the same. Fig. 3 is a sectional view, showing the clock mechanism in connection with the globe.

In the drawings, A is the base, and within this base the clock mechanism is shown; but this clock mechanism may be placed in sight above the base, or it may be placed within the globe.

B B are posts or standards sustaining the rim C.

D is a meridian, and forms also the upper bearing of the shaft on which the globe turns.

E is a sphere, the outer surface of which represents the outline of the various countries on the earth and the names of the most important places. It is also provided with the ring F, on which two sets of figures, numbering from 1 to 12, are marked, and also with the ring G, one half of which is made of a dark and the other half of a light color, so as to indicate night and day. Both of these rings can be adjusted with reference to the map on the globe and with the meridian. The ring G may, however, be dispensed with, and one-half of the figures on the ring F may be made black on a light ground, or they may be distinguished in any other way, so as to indicate which are for the day and which for the night.

Surrounding the globe is the beveled rim H, graduated into twenty-four divisions or hours, indicating the hours of the full day, or day and night. This rim may be graduated to show also the minutes. As the globe is marked with the meridians, any place on the globe can be readily traced to the rim H; and, assuming, now, that the globe is fixed and set for the place in which it is located for twelve o'clock noon, then the time of any place on the globe can be readily found on the rim H by observing on which meridian or between which meridians the same is located and examining the figures on the rim H. If, now, the clock is set in motion and the globe is made to rotate once every day the time of day or night at any place will be correctly found on the rim H for any place on the earth, and at any time required. The rim H may also be divided into day and night by making one half darker than the other half, or otherwise distinguishing the two halves of the circle.

The meridian D acts as a pointer to indicate the time at the place for which the clock is set; but any other kind of pointer may be used.

On the rim C the most important places on the earth are indicated by name at their respective places of longitude around the globe. On the drawing Fig. 2 the outer edge of the rim C is shown graduated into degrees of longitude east and west from Greenwich; but it is obvious that any other place may be selected for the zero-point. If, now, the globe is set so that the meridian D or any fixed pointer is placed, as shown, at twelve o'clock at Boston, then the correct time at any place will be indicated by the figures on the ring F on the globe at that time; and if the globe is made to rotate by the clock-work once each day the time at any place marked on the rim at any time of day or night will be shown by the figures on the rim F opposite the name of the place.

It is obvious that the rim C may be dispensed with; and it is particularly instructive to children, if they have to find the time at any place on the earth, by first finding the place on the globe, and then finding the time on the rim H; but for commercial use it saves time to have the most important places indicated on the rim C.

In Fig. 3 it will be observed that the globe is supported on the tube I, and is connected with the clock-work L, so as to turn once in each twenty-four hours. The spindle K is also connected with the clock-work; but it is made to turn around once in every hour.

To the spindle K the rim M, graduated to indicate the sixty minutes of each hour, is secured, and as it turns once in every hour the minutes are indicated by the meridian D, as is shown in Fig. 1.

N is a hand connected with the tube I, so that it may be swung around on the face of the globe. It may be used for the purpose of marking any particular location on the globe, so as to quickly see the time of day or night at such place at any time desired. To illustrate this, it may be considered that a person in New York wishes to telegraph to Pekin. By placing the hand or pointer over Pekin he can quickly tell the time at Pekin, and see whether the telegram can reach Pekin during certain hours. He can also readily ascertain whether an answer can be received.

The hand or pointer can be used as an indicator for other purposes—such for instance, as pointing out the place or meridian for which the clock is set—as the clock may be set so as to indicate the correct time at any other place than the one at which it is located, thus indicating the time, say, at Greenwich, England, and the corresponding time at all other places on the earth.

To allow the lower part of the globe to be seen, the mirror O is placed below the globe, so that this lower part may be seen by reflection, the degree of longitude ascertained, and then the time by reference to the rim H.

The whole may be placed under a glass globe or shade, or it may be inclosed by glass, as indicated in broken lines in Fig. 1.

The improved clock is not only valuable for business purposes, but for the home and the library, as it teaches geography in a most attractive manner, and familiarizes the young with the location of important places on the earth, not only with reference to each other, but with reference to the difference in time, combining thereby the study of latitude and longitude and the relative position of the sun to any and all places.

We do not wish to confine ourselves to the exact construction shown, but wish to vary the same to suit differences in taste and in size.

Having thus described our invention, we claim as new and desire to secure by Letters Patent—

1. The combination, with a globe having a representation of the earth on its surface and an equator or ring divided and marked by figures into the twenty-four hours, rotated by clock-work, of the meridian D, supported on a fixed rim, also divided by figures into the twenty-four hours of a day, constructed to indicate the time as described.

2. The combination, with the globe E and the clock-mechanism L, of the rim C, provided with the names of prominent places, as described, the meridian D, and the ring F, constructed to indicate the time at the several places, as described.

3. In a clock constructed to indicate the time by a revolving globe, the combination, with the globe, of the rings F and G, constructed to indicate day and night, as described.

4. The combination, with a globe rotated by clock-work, and the rim C, of the mirror O, constructed to reflect the lower part of the globe, as described.

5. The combination, with the base A, posts B B, rim C, and meridian D, of the globe E, provided with the divided ring F, and driven by clock-work, and the minute-ring M, constructed to indicate the time at different points on the earth, as described.

6. The combination, with the frame and standard, as described, of the clock-work L, the tube I, supporting and rotating the globe, and the spindle K, supporting and rotating the minute-ring, as described.

7. As a new article of manufacture, a clock consisting of a globe rotated by clock-work, and provided with figures around the equator indicating the twenty-four hours of day and night, and a fixed frame marked with the twenty-four hours and the names of prominent places, surmounted by a meridian, as described.

SAML. MOORE.
GEORGE A. HADLEY.

Witnesses:
JOSEPH A. MILLER,
M. E. EMERSON.